United States Patent
Hsu et al.

(10) Patent No.: US 12,277,014 B2
(45) Date of Patent: Apr. 15, 2025

(54) MOTHERBOARD

(71) Applicant: PEGATRON CORPORATION, Taipei (TW)

(72) Inventors: Pei-Chun Hsu, Taipei (TW); Han-Sheng Peng, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 351 days.

(21) Appl. No.: 18/151,419

(22) Filed: Jan. 6, 2023

(65) Prior Publication Data
US 2023/0280803 A1    Sep. 7, 2023

(30) Foreign Application Priority Data

Mar. 4, 2022  (TW) ................................. 111107879

(51) Int. Cl.
| | |
|---|---|
| G06F 13/36 | (2006.01) |
| G06F 1/18 | (2006.01) |
| G06F 1/3215 | (2019.01) |
| G06F 13/16 | (2006.01) |
| G06F 13/42 | (2006.01) |

(52) U.S. Cl.
CPC .......... *G06F 1/189* (2013.01); *G06F 1/3215* (2013.01); *G06F 13/1694* (2013.01); *G06F 13/423* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 5,768,147 A | 6/1998 | Young | |
| 10,082,842 B1 * | 9/2018 | Looi | ..................... G06F 13/409 |
| 2014/0009521 A1 * | 1/2014 | Pedra | ................... B41J 2/04555 |
| | | | 347/10 |
| 2020/0125288 A1 | 4/2020 | Lim | |
| 2021/0019065 A1 | 1/2021 | Hsieh | |
| 2022/0175349 A1 * | 6/2022 | Wang | ................... A61B 8/5207 |

OTHER PUBLICATIONS

"Search Report of Europe Counterpart Application", issued on Jul. 17, 2023, pp. 1-8.

* cited by examiner

*Primary Examiner* — Henry Tsai
*Assistant Examiner* — Dean Phan
(74) *Attorney, Agent, or Firm* — J.C. PATENTS

(57) ABSTRACT

A motherboard includes a connector, a controller, a platform controller hub and a switch block. The connector is configured to be electrically connected to an expansion card, and includes a first pin, a second pin and a third pin. The controller includes an analog-to-digital converter coupled to the first pin. The controller identifies a digital voltage value of the first pin via the analog-to-digital converter, and generates a power supply requirement and a signal transmission requirement corresponding to the expansion card based on the digital voltage value. The switch block is coupled to the second pin, the third pin, the controller and the platform controller hub. The switch block provides a power supply voltage to the second pin based on the power supply requirement, and the switch block couples the third pin to the platform controller hub based on the signal transmission requirement.

10 Claims, 2 Drawing Sheets

MOTHERBOARD

CROSS-REFERENCE TO RELATED APPLICATION

This application claims the priority benefit of Taiwan application Ser. No. 111107879, filed on Mar. 4, 2022. The entirety of the above-mentioned patent application is hereby incorporated by reference herein and made a part of this specification.

BACKGROUND

Technical Field

The disclosure relates to a motherboard, and in particular relates to a motherboard that supports expansion cards with special specifications.

DESCRIPTION OF RELATED ART

In order to provide expansion functions, expansion slots (i.e., expansion connectors) are usually provided on the motherboard, but conventional expansion slots only support devices with interfaces of specific industry standards (e.g., PCIE/SATA/USB) and specific power ratings (e.g., less than 2.5 A). To support specially designed or high-power devices, there are concerns about damage to the motherboard or device.

SUMMARY

The disclosure provides a motherboard. By adding a power supply switch and a signal switch, the motherboard may support specially designed or high-power devices.

The motherboard of the disclosure includes a connector, a controller, a platform controller hub, and a switch block. The connector is configured to be electrically connected to an expansion card, and includes a first pin, a second pin, and a third pin. The controller includes an analog-to-digital converter, the analog-to-digital converter is coupled to the first pin, the controller identifies a digital voltage value of the first pin via the analog-to-digital converter, and generates a power supply requirement and a signal transmission requirement corresponding to the expansion card based on the digital voltage value. The platform controller hub has multiple platform signal pins. The switch block receives multiple power supply voltages and is coupled to the second pin, the third pin, the controller, and the platform controller hub. The switch block provides one of the power supply voltages to the second pin based on the power supply requirement, and the switch block couples the third pin to one of the platform signal pins based on the signal transmission requirement.

Based on the above, the motherboard of the embodiment of the disclosure may provide additional power supply voltage to the expansion card (not shown) through the switch block to meet higher voltage requirements than industry standards and/or provide additional signal paths to meet signal transmission requirements different from industry standards. In this way, the motherboard may support expansion cards with various special functions, and no additional connection interface is required, which greatly reduces the volume of the motherboard and reduces the hardware cost.

In order to make the aforementioned features and advantages of the disclosure comprehensible, embodiments accompanied with drawings are described in detail below.

DETAILED DESCRIPTION OF DISCLOSED EMBODIMENTS

Figure 1:
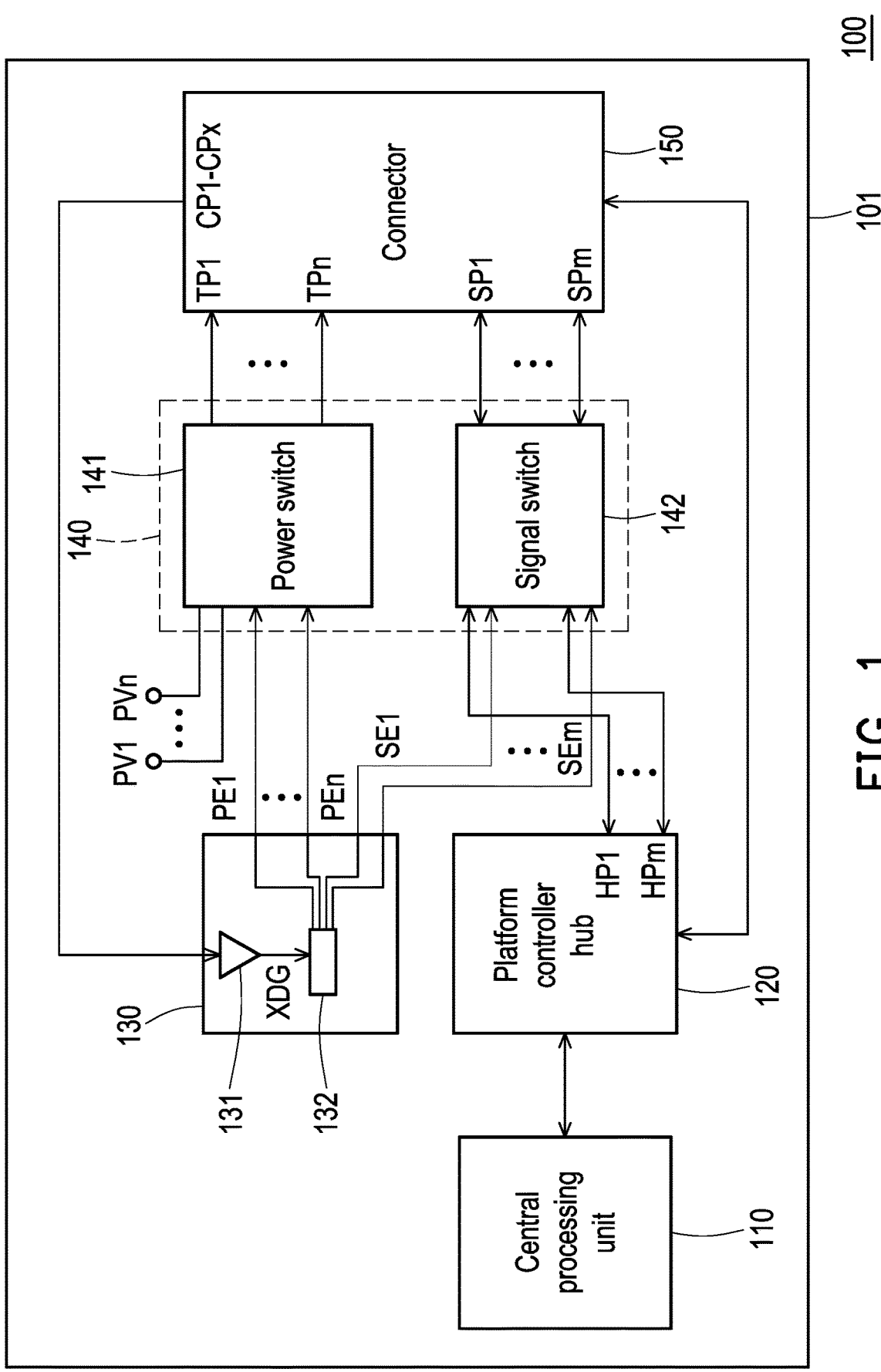
FIG. 1 is a system schematic diagram of a motherboard according to an embodiment of the disclosure.

FIG. 1 is a system schematic diagram of a motherboard according to an embodiment of the disclosure. Referring to FIG. 1, in this embodiment, the motherboard 100 includes a platform controller hub 120, a controller 130, a switch block 140, and a connector 150. In some embodiments, the motherboard 100 may further include a substrate 101 and a central processing unit 110. The central processing unit 110, the platform controller hub 120, the controller 130, the switch block 140, and the connector 150 are disposed on the substrate 101, and the central processing unit 110 is coupled to the platform controller hub 120.

In this embodiment, the switch block 140 is coupled to the platform controller hub 120, the controller 130, and the connector 150. The connector 150 bypasses the switch block 140 and is directly coupled to the platform controller hub 120 and the controller 130. The wiring between the connector 150 and the platform controller hub 120 meets the industry standards for particular connectors (e.g., an M.2 connector).

The connector 150 is configured to be electrically connected to the expansion card (not shown), and includes at least one first pin (e.g., one of, a portion of, or all of CP1 to CPx), at least one second pin (e.g., one of, a portion of, or all of TP1 to TPn) and at least one third pin (e.g., one of, a portion of, or all of SP1 to SPm). The connector 150 is, for example, an M.2 connector, the first pins CP1 to CPx may be configuration pins of the M.2 connector, the second pins TP1 to TPn may be power supply pins or idle pins of the M.2 connector, and the third pins SP1 to SPm may be signal pins or idle pins of the M.2 connector.

The platform controller hub 120 has one or more platform signal pins (e.g., one of, a portion of, or all of HP1 to HPm), and each of the platform signal pins HP1 to HPm is, for example, a universal serial bus (USB) overcurrent pin, a memory card presence bit pin, etc.

The controller 130 includes an analog-to-digital converter 131, and the analog-to-digital converter 131 is coupled to the first pins CP1 to CPx. The controller 130 identifies the digital voltage value (e.g., XDG) of the first pins CP1 to CPx coupled to the analog-to-digital converter 131 via the analog-to-digital converter 131, and generates a power supply requirement and a signal transmission requirement corresponding to the expansion card based on the digital voltage value XDG. The analog-to-digital converter 131 may provide a corresponding quantity of digital voltage values XDG based on the voltage levels of one of, a portion of, or all of the first pins CP1 to CPx. In this embodiment, a single digital voltage value XDG may provide additional device identifications, so more digital voltage values XDG may provide more device identifications, which depends on circuit requirements.

The switch block 140 receives multiple power supply voltages PV1 to PVn, and is coupled to at least one of the second pins TP1 to TPn, at least one of the third pins SP1 to SPm, the controller 130, and the platform controller hub 120. The switch block 140 provides one of the power supply voltages PV1 to PVn to the expansion card through the corresponding one of the coupled second pins TP1 to TPn based on the power supply requirement. The switch block 140 couples each of the coupled third pins SP1 to SPm to a corresponding one of the platform signal pins HP1 to HPm based on the signal transmission requirement.

According to the above, the conventional connector meeting the industry standard may allow the platform controller hub 120 of the motherboard 100 to identify which type of expansion card is connected to through the configuration pins. Due to the limitation of configuration pins, the platform controller hub 120 may generally only support limited expansion card types, that is, the limitation of power supply and the flow directions of signals are limited by industry standards. However, additional power supply voltages PV1 to PVn may be provided to the expansion card (not shown) through the switch block 140 to meet higher voltage requirements than industry standards and/or provide additional signal paths to meet signal transmission requirements of different industry standards.

In the embodiment of the disclosure, the switch block 140 includes a power supply switch 141 and a signal switch 142. The power supply switch 141 receives the power supply voltages PV1 to PVn and is coupled to the second pins TP1 to TPn and the controller 130, and provides one of the power supply voltages PV1 to PVn to the expansion card (not shown) through the corresponding one of the second pins TP1 to TPn based on the power supply requirement.

The signal switch 142 is coupled to the third pins SP1 to SPm, the controller 130, and the platform controller hub 120, and couples one of the third pins SP1 to SPm to a corresponding one of the platform signal pins HP1 to HPm based on the signal transmission requirement. In addition, different expansion cards may have different connection methods. For example, the platform signal pin HP1 in the first expansion card may be provided to the third pin SP1, but the platform signal pin HP1 in the second expansion card may be provided to the third pin SP2, which depends on the circuit design, and the disclosure is not limited thereto.

In the disclosed embodiment, the controller 130 further includes a determining circuit 132. The determining circuit 132 is coupled to the analog-to-digital converter 131 and may provide multiple first enabling signals (e.g., PE1 to PEn) to the power supply switch 141 based on the power supply requirement, and provide multiple second enabling signals (e.g., SE1 to SEm) to the signal switch 142 based on the signal transmission requirement. Each of the first enabling signals PE1 to PEn may correspondingly decide whether each of the power supply voltages PV1 to PVn is provided to a corresponding one of the second pins TP1 to TPn, and the second enabling signal SE1 to SEm may correspondingly decide whether one of the third pins SP1 to SPm is coupled to a corresponding one of the platform signal pins HP1 to HPm.

In an embodiment of the disclosure, the power supply requirement may include at least one of a voltage requirement and a power requirement corresponding to an expansion card (not shown). The voltage requirement is used for selecting a corresponding one of or a portion of the power supply voltages PV1 to PVn based on the voltage levels of the power supply voltages PV1 to PVn, and the selected power supply voltages PV1 to PVn are respectively provided to the expansion card (not shown) through a corresponding one of or a portion of the second pins TP1 to TPn.

In other words, each of the second pins TP1 to TPn may have different voltage level requirements (e.g., 3.5V, 5V, 9V, 12V, etc.), therefore, the power supply switch 141 may distribute one of the voltage levels of the power supply voltages PV1 to PVn that meets the requirements of each of the second pins TP1 to TPn to each of the second pins TP1 to TPn. In addition, different expansion cards may have different connection methods. For example, the power supply voltage PV1 in the first expansion card may be provided to the second pin TP1, but the power supply voltage PV1 in the second expansion card may be provided to the second pin TP2, which depends on the circuit design, and the disclosure is not limited thereto.

The power supply requirement is used for selecting a corresponding one of or a portion of at least one power supply voltage PV1 to PVn based on the power level of the expansion card, and provide the selected power supply voltage PV1 to PVn to a corresponding one of or a portion of the second pins TP1 to TPn. In other words, the expansion card may have a higher power requirement than the industry standard, therefore the power supply switch 141 may provide the power supply voltages PV1 to PVn to the corresponding portion of the second pins TP1 to TPn based on the additional power requirement of the expansion card. For example, assuming that the power supply voltages PV1 to PVn may provide 0.5 watts of power, and the additional power requirement of the expansion card is 2 watts, the power supply switch 141 may provide four of the power supply voltages PV1 to PVn to the corresponding 4 of the second pins TP1 to TPn. In addition, different expansion cards may have different connection methods. For example, the power supply voltages PV1 to PV4 in the first expansion card may be provided to the second pins TP1 to TP4, but the power supply voltages PV1 to PV4 in the second expansion card may be provided to the second pins TP5 to TP8, which depends on the circuit design, and the disclosure is not limited thereto.

Figure 2:
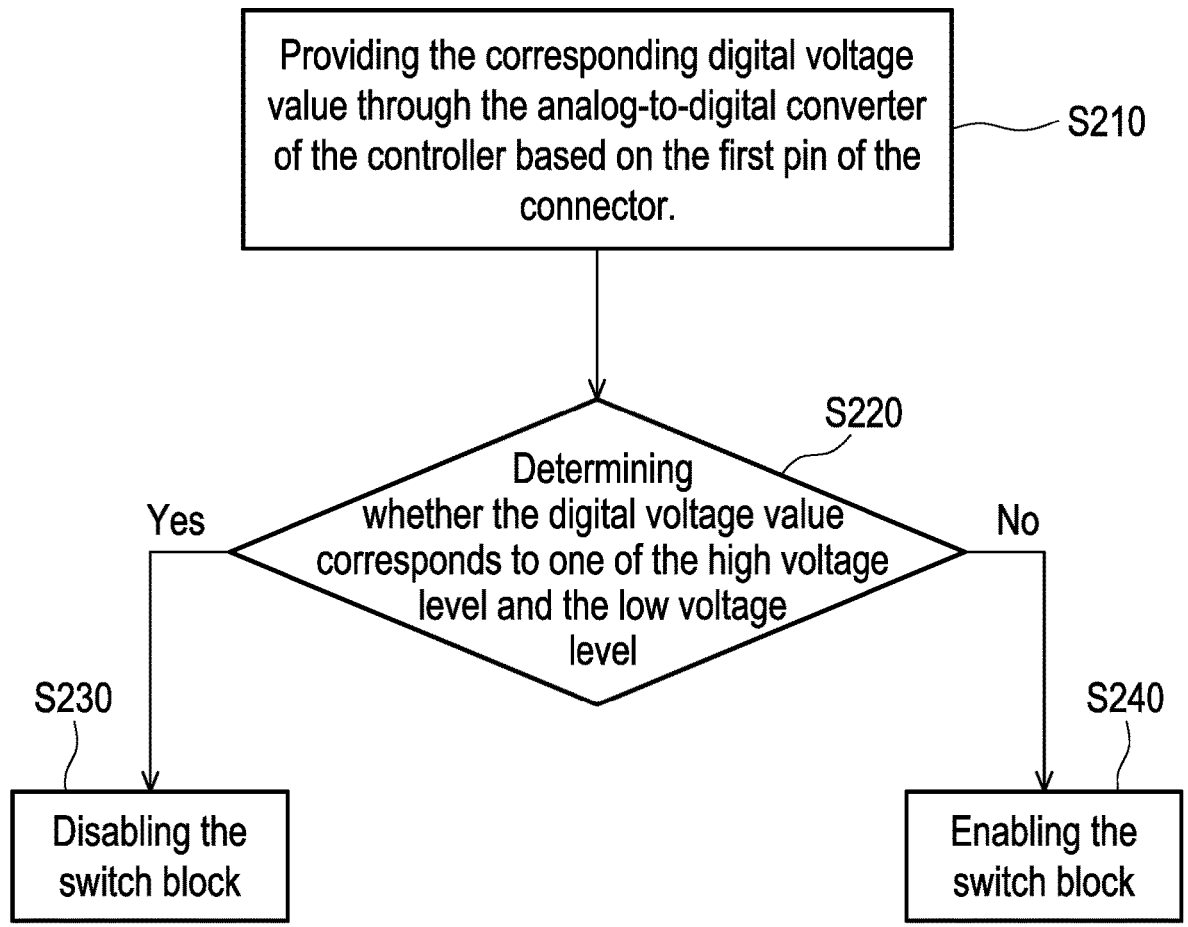
FIG. 2 is an operation flowchart of a controller according to an embodiment of the disclosure.

FIG. 2 is an operation flowchart of a controller according to an embodiment of the disclosure. Referring to FIG. 1 and FIG. 2 together, in this embodiment, the operation of the controller includes the following steps.

In step S210, a corresponding digital voltage value is provided through the analog-to-digital converter of the controller based on the first pin of the connector. Specifically, the controller 130 identifies the digital voltage values of the first pins CP1 to CPx via the analog-to-digital converter 131.

In step S220, whether the digital voltage value corresponds to one of the high voltage level and the low voltage level is determined. For example, the high voltage level is, for example, 3.3V, and the low voltage level is, for example, 0V. When the digital voltage value corresponds to one of the high voltage level and the low voltage level (the determination result is "Yes"), step S230 is executed. Conversely, when the digital voltage value does not correspond to one of the high voltage level and the low voltage level (the determination result is "No"), step S240 is executed.

In step S230, the switch block is disabled. Specifically, when the first pins CP1 to CPx are all at a high voltage level or a low voltage level (i.e., each of the digital voltage value XDG corresponds to one of a high voltage level and a low voltage level), it means that the expansion card is an electronic device meeting the industry standard, that is, the electronic device has no special power supply or signal requirement. At this time, the controller 130 may disable the switch block 140 to avoid affecting the operation of the expansion card.

In step S240, the switch block is enabled. Specifically, when one of, a portion of, or all of the first pins CP1 to CPx are not at the high voltage level or the low voltage level (e.g., 1.65V, that is, at least one of the digital voltage values XDG does not correspond to one of the high voltage level and the low voltage level), it means that the expansion card is an electronic device that does not meet industry standards, that is, an electronic device that has special power supply or signal requirements. At this time, the controller 130 may enable the switch block 140 to perform circuit operations outside the industry standard.

The sequence of the aforementioned steps S210, S220, S230, and S240 is for description, and the embodiment of the disclosure is not limited thereto.

To sum up, the motherboard of the embodiment of the disclosure may provide additional power supply voltage to the expansion card through the switch block to meet higher voltage requirements than industry standards and/or provide additional signal paths to meet signal transmission requirements of different industry standards. In this way, the motherboard may support expansion cards with various special functions, and no additional connection interface is required, which greatly reduces the volume of the motherboard or host system with a motherboard, and reduces the hardware cost.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and their equivalents and not by the above detailed descriptions.

What is claimed is:

1. A motherboard, comprising:
    a connector, configured to be electrically connected to an expansion card, and comprising a first pin, a second pin, and a third pin;
    a controller, comprising:
        an analog-to-digital converter, coupled to the first pin, wherein the controller identifies a digital voltage value of the first pin by the analog-to-digital converter, and generates a power supply requirement and a signal transmission requirement corresponding to the expansion card based on the digital voltage value;
    a platform controller hub, having a plurality of platform signal pins; and
    a switch block, receiving a plurality of power supply voltages, and coupled to the second pin, the third pin, the controller, and the platform controller hub, wherein the switch block provides one of the power supply voltages to the expansion card through the second pin based on the power supply requirement, and the switch block controls the third pin to be coupled to one of the platform signal pins based on the signal transmission requirement.

2. The motherboard according to claim 1, wherein the switch block comprises:
    a power supply switch, receiving the power supply voltages, and coupled to the second pin and the controller, wherein the power supply switch provides the one of the power supply voltages to the expansion card through the second pin based on the power supply requirement; and
    a signal switch, coupled to the third pin, the controller, and the platform controller hub, and controlling the third pin to be coupled to the one of the platform signal pins based on the signal transmission requirement.

3. The motherboard according to claim 2, wherein the controller provides a plurality of first enabling signals to the power supply switch based on the power supply requirement, and provides a plurality of second enabling signals to the signal switch based on the signal transmission requirement.

4. The motherboard according to claim 1, wherein the connector is an M.2 connector.

5. The motherboard according to claim 4, wherein the first pin comprises a configuration pin of the M.2 connector.

6. The motherboard according to claim 4, wherein the second pin and the third pin respectively comprise one of a power supply pin, a signal pin, or an idle pin of the M.2 connector.

7. The motherboard according to claim 1, wherein the power supply requirement comprises at least one of a voltage requirement and a power requirement corresponding to the expansion card.

8. The motherboard according to claim 1, wherein when the digital voltage value corresponds to one of a high voltage level and a low voltage level, the controller disables the switch block.

9. The motherboard according to claim 1, wherein the platform controller hub is coupled to a central processing unit.

10. The motherboard according to claim 1, wherein the controller is directly coupled to the platform controller hub.

* * * * *